United States Patent [19]

Schermutzki

[11] Patent Number: 4,578,021

[45] Date of Patent: Mar. 25, 1986

[54] APPARATUS FOR THE PRODUCTION OF GRANULES FROM TWO-PHASE MIXTURES

[75] Inventor: Konrad Schermutzki, Remseck, Fed. Rep. of Germany

[73] Assignee: Santrade Ltd., Lucerne, Switzerland

[21] Appl. No.: 547,492

[22] Filed: Nov. 1, 1983

[51] Int. Cl.⁴ .................... B29C 39/38; B29C 39/44
[52] U.S. Cl. ............................... 425/6; 425/143; 425/145; 425/376 B; 425/378 R; 425/456
[58] Field of Search ............... 422/245, 246; 425/6, 425/8, 376 A, 376 B, 378 R, 380, 381, 143, 145, 456; 264/5-9, 13; 366/144, 145; 23/301, 295 R

[56] References Cited

U.S. PATENT DOCUMENTS

| | | | |
|---|---|---|---|
| 2,268,888 | 1/1942 | Mericola | 425/6 |
| 2,529,466 | 11/1950 | Weldon | 264/7 |
| 2,610,478 | 9/1952 | Lofstedt | 366/144 |
| 2,633,604 | 4/1953 | Allen et al. | 425/6 |
| 2,685,537 | 8/1954 | Dunmire | 264/7 |
| 3,189,944 | 6/1965 | Jacklin | 264/13 |
| 3,208,101 | 9/1965 | Kaiser et al. | 425/6 |
| 3,255,282 | 6/1966 | Shaffer et al. | 264/7 |
| 3,288,892 | 11/1966 | Bewley et al. | 425/6 |
| 3,329,745 | 7/1967 | La Grange | 264/5 |
| 4,004,886 | 1/1977 | Thijssen et al. | 422/245 |
| 4,238,429 | 12/1980 | Sasaki et al. | 425/6 |
| 4,279,579 | 7/1981 | Froeschke | 425/6 |
| 4,336,213 | 6/1982 | Fox | 425/376 B |

FOREIGN PATENT DOCUMENTS

| | | |
|---|---|---|
| 1287045 | 1/1969 | Fed. Rep. of Germany . |
| 1767381 | 10/1971 | Fed. Rep. of Germany . |
| 2941802 | 4/1981 | Fed. Rep. of Germany . |
| 2853054 | 7/1981 | Fed. Rep. of Germany . |

Primary Examiner—Willard E. Hoag
Attorney, Agent, or Firm—Burns, Doane, Swecker & Mathis

[57] ABSTRACT

An apparatus produces granules from two-phase mixtures wherein an initial substance is enriched with crystal nuclei in a temperature controlled precrystallizer and the resultant precrystallized melt is fully crystallized on a cooling surface. A droplet former is disposed over the cooling surface and includes inner and outer telescoping tubes. The inner tube communicates downstream with the precrystallizer and has a plurality of outlet orifices for conducting the precrystallized melt outwardly therethrough. The outer and inner tubes are arranged for relative rotation. The outer tube has a plurality of discharge orifices which are intermittently alignable with the outlet apertures in response to relative rotation between the tubes for discharging drops of precrystallized mass onto the cooling surface.

12 Claims, 2 Drawing Figures

APPARATUS FOR THE PRODUCTION OF GRANULES FROM TWO-PHASE MIXTURES

BACKGROUND AND OBJECTS OF THE INVENTION

The invention concerns an apparatus for the production of granules from two-phase mixtures, wherein the initial product is enriched with crystalline nuclei in a temperature controlled precrystallizer and the precrystallized melt subsequently crystallized on a cooling conveyor or the like.

Installations of this type may be used for example in the production of antioxidants, nickel catalysts, insecticides or morpholine sulfonamide. In the process the precrystallized, undercooling melt is placed directly on a cooling conveyor and is crystallized thereon. The crystallized product is taken in the form of webs or plates from the cooling conveyor and ground into granules. It is a disadvantage that such an additional process step is required after the crystallization, and also that the grinding of the product does not produce a uniform grain size. Furthermore, the dust component generated in the grinding process is undesirable.

So-called droplet formers are known; they are used in the granulation of other products, which are dropped in the liquid form and then solidified on cooling conveyors to the granulate desired. In view of the relatively long retention time of the melt in the reservoirs of the droplet formers, such installations cannot be used for the processing of the afore-cited two-phase mixtures, because depositions and incrustations (bridges) may be formed, so that the operation of the droplet former is no longer assured. Furthermore, viscosity fluctuations in the medium, such as those caused by nucleation of crystals, may lead to obstructions of the conveyor system, as in most droplet formers the droplets are formed by gravity. Undercooling melts with crystal nuclei mixed into them are therefore shaped and ground into granules in the above-described manner only.

It is the object of the present invention to provide an apparatus for the production of granules from two-phase mixtures of this type, whereby the additional grinding process is eliminated and in spite of this, the formation of the granules of excellent quality is obtained in a simple manner.

SUMMARY OF A PREFERRED EMBODIMENT OF THE INVENTION

The invention consists of the fact that the precrystallizer is followed in line by a droplet former comprising two tubular bodies placed against each other with their walls, one of said bodies being equipped with a plurality of passage orifices distributed over its circumference for the melt and the other only with a row of coaxial orifices and that the droplet former is arranged over the cooling conveyor so that the row of coaxial passage orifices which during the relative rotation of the two tubular bodies is aligned cylindrically with the orifices of the other tubular body, is facing the cooling conveyor. This configuration makes it possible, to drop the melt very rapidly, so that between the precrystallizer and the droplets already formed no large dead spaces and long retention times are generated, which may lead to an undesirable premature crystallization.

It is particularly advantageous that in this new apparatus for precrystallized melts, a device may be provided for establishing a forced transportation to the droplet former, and the droplet former may be connected by a closed feed line with the precrystallizer. The feeding of the product may therefore be effected independently of gravity so that the higher capacities and throughputs may be obtained, which in turn is the decisive factor whereby undercooling melts mixed with crystal nuclei may be converted to a droplet form in an industrially applicable manner at all.

It is a further advantage when a droplet former with an inner and an outer tube is used, that the feed line may have the same or approximately the same diameter as the inner tubular body of the droplet former and may open axially into said inner tube, so that no appreciable changes take place in the flow velocity of the melt from the precrystallizer to the droplet former. No dead spaces appear with respect to the flow and a constant flow rate may be assured, which is a precondition of droplet forming in the novel apparatus.

It is an obvious further advantage that the entire system of the precrystallizer, feed line and droplet former may not only be maintained under pressure, but also completely airtight so that melts may be processed, which otherwise would undergo chemical conversion processes, for example, under the effect of oxygen, thereby affecting quality with respect to the dropping process and also in other relationships.

In the layout of the precrystallizer it is advantageous to equip it with a bypass and a pump located therein, and to branch the feed line to the droplet former off this bypass conduit. It is then possible to determine accurately the volume to be brought to the droplet former by means of a gear pump or another metering pump without affecting decisively and possibly detrimentally the precrystallization process, for which the flow rate through the precrystallizer, consisting for example of a tube equipped with baffles in the form of rotating blades and with a temperature controlled outer jacket, may be regulated as a function of the crystal nucleation desired, wherein the volume of the material flowing through the precrystallizer must then be substantially greater than the volume supplied to the droplet former. This circulation is also required fot the exact coordination of crystal nucleation with the dropping velocity. It has been found that a highly accurate ratio of crystal nuclei to the still liquid components in the mass to be dropped is important, as the high droplet form and the solidification of the droplets depend on it.

It has, therefore, been found to be highly advantageous to control in a precrystallizer with a water cooling jacket the temperature of the cooling medium as a function of the crystal content of the melt to be dropped. For this purpose a density measuring instrument may be set in the feed line from the precrystallizer to the droplet former to effect an exact regulation of the temperature of the cooling medium circulation. Alternatively, it is possible to scan the height of the ready crystallized droplet at the end of the conveyor, which is also dependent on the crystal content during the droplet forming process. It has been found that with increasing crystalline proportion the height of the particles dropped onto and solidifying on the cooling conveyor is rising, while in the case of slight crystal contents they become excessively flat and pancake like.

To affect the droplets formed subsequently to the droplet former on the conveyor, it is further advantageous, to the extent that mixtures of solids and the melt, for example, dispersions with high solids content are processed, to (i) provide a vibrator under the conveyor to act on the still flowable, newly formed droplets and (ii) to insure that the uppermost peak of individual mass particles dropping onto the conveyor, which tends to solidify more rapidly and to remain as an undesirable tip on the final product like to break-off, sinks into the still hot remaining mass, thereby providing very attractive hemispherical granule shapes.

THE DRAWING

The invention is illustrated by means of an embodiment depicted in the drawing, and explained in detail in the description hereinbelow. In the drawing.

DETAILED DESCRIPTION OF A PREFERRED EMBODIMENT OF THE INVENTION

Figure 1:
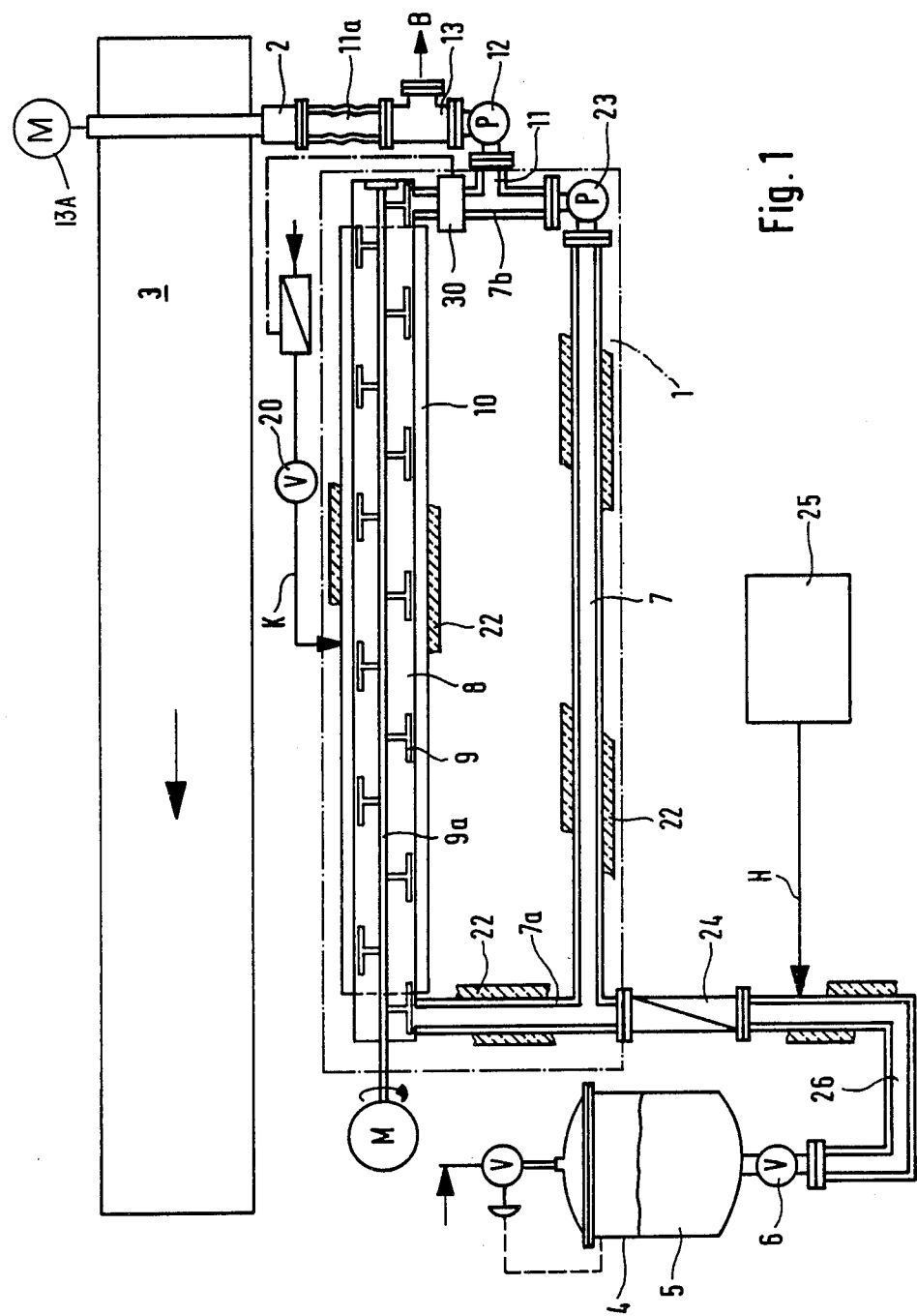
FIG. 1 is a schematic top view of an apparatus according to the invention.

FIG. 1 shows the fundamental layout of the apparatus according to the invention. The installation comprises a precrystallizer 1 to induce nucleation in an initial product 5, a droplet former 2 to form droplets from the precrystallized melt and a cooling conveyor 3 to crystallize the droplets of the product.

The precrystallizer 1 has a tube 8 and a bypass consisting of the conduit sections 7, 7a and 7b and connected with the tube 8. A pump 23 is arranged in the bypass, whereby the melt to be precrystallized may be moved in circulation through the bypass 7 and the tube 8.

The liquid initial product 5 is supplied to the precrystallizer 1 from a reservoir 4 through a valve 6, the line 26 and a heat exchanger 24 and arrives in the tube 8, in which helical blades 9 are arranged on a rotating shaft 9a, driven by a motor M and supporting the introduction of nucleation. The melt, in which nucleation has been initiated during its transportation through the tube 8, arrives in the conduit section 7b and is moved through a supply line 11 opening into said section 7b, a gear pump 12 and a variable closing valve 13 to the droplet former 2. A certain measurable portion of the melt is pumped through the bypass section 7 by means of the pump 23 and is mixed in the opening area between the conduit section 7a and the section 7 with the as yet uncrystallized initial product 5 and then again passes into the tube 8.

To control the precrystallization product taking place, accurate temperature regulation and the maintenance of optimum temperatures are necessary. The conduit sections 7, 7a and 7b, together with the line 26 through which the initial product is passing to the precrystallizer 1, therefore consist of double walled tubes connected with a heating installation 25, whereby, for example, water H heated by saturated steam is circulated through the aforementioned sections. The temperature in the different areas of the precrystallizer and the line 26 is monitored by several temperature measuring devices (not shown for the sake of simplicity), so that by means of valves (not shown) the water circulation may be controlled. The melt temperature may be affected further for stabilization by means of the heat exchanger 24.

The tube 8, wherein the precrystallization process is initiated, is surrounded by a cooling water jacket 10 connected with a cooling water circulation K. Nucleation takes place as the result of cooling in the area of the tube 8. The individual conduit sections of the hot water circuit and the cooling jacket 10 are surrounded by the insulation 22 (indicated only in the drawing), so that better stabilization and constant maintenance of the temperatures are possible. The temperature of the cooling medium is regulated exactly in a manner explained in detail hereinafter.

Figure 2:
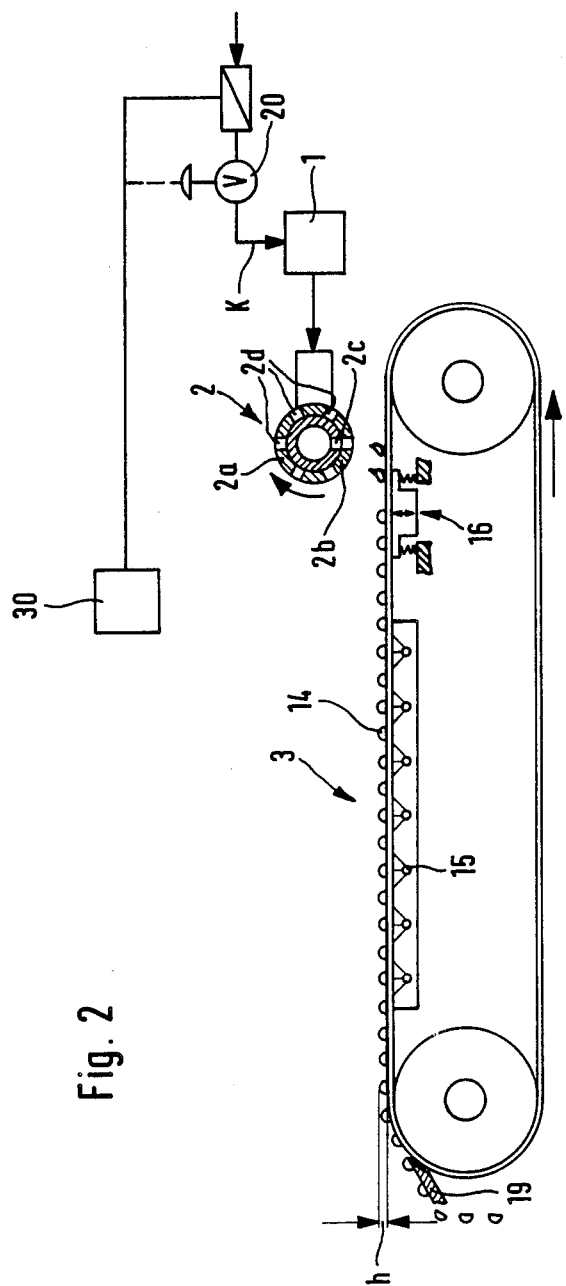
FIG. 2 is a schematic lateral elevational view of the area of the cooling conveyor with a rotor droplet former in a sectioned representation.

The feed line 11, through which the droplet former 2 is connected with the bypass of the precrystallizer 1 and in which the gear pump 12 and the variable shutoff valve 13 are arranged, has the same or nearly the same diameter as the inner tubular body 2b of the droplet former 2 as seen in FIG. 2 and opens with the hose-like section 11a axially into the droplet former 2. As the result of this short feed line, through which the melt is moved under pressure, there is no appreciable change in the viscosity of the melt from the precrystallizer to the formation of the droplets. A constant flow rate is assured by the associated pump, independently of the gravity effect. Altogether, the retention time of the precrystallized melt in the feed line to the dropping is relatively short as a result of these measures, so that no crystallization of the melt takes place in the process, that could lead to deposits and clogging and could interefere with the uniform formation of droplets.

The entire system of the precrystallizer 1, feed line 11 and the droplet former may be closed off in a completely airtight manner so that melts, against which a flow of oxygen during the precrystallization process would have a detrimental effect with respect to quality, may be processed.

The installation may be shut down by means of the closing valve 13 arranged in the feed line 11 and the melt still in the precrystallizer may be pumped toward a reservoir in direction B.

As seen in FIG. 2, the droplet former 2 comprises an outer tube 2a and an inner tube 2b. In the stationary inner tube a coaxially arranged row of outlet orifices 2c is arranged, which are aligned cyclically with discharge orifices 2d distributed over the circumference of the outer tube 2a upon the rotation of the latter, which is driven by a motor 13A. In this manner, the precrystallized melt is fed in droplets from the precrystallizer 1 (shown only in FIG. 1), onto the cooling conveyor. With the aid of a vibrator 16 the still flowable, freshly formed droplets are acted upon, so that the peaks formed during the dropping are collapsing and product tablets 14 are of an attractive granular shape. It is thereby possible to effect the formation of droplets at a low temperature whereby the products are preserved and less energy is required in view of the shorter cooling time on the cooling conveyor 3. The proportion of dust in the product is also reduced. As the product is already precrystallized when dropped onto the cooling conveyor 3, it is sufficient to provide cooling by means of the refrigerating device 15, on the cooling conveyor 3 at a constant cooling temperature. Zone cooling, as required in the known installations, is not necessary with the apparatus of the invention.

As the crystal content during the dropping process is of decisive importance for the particle formation and for the execution of this type of granular production, a measuring instrument 30 is provided, which determines this crystal content for example, by means of density measurements. In the embodiment example, this measuring instrument is placed in the line 7b. By means of the measuring instrument 30 the regulation of the temperature of the cooling medium circulation K is effected in a manner not shown in detail. It is further possible to control the volume of the cooling medium by acting on the valve 20 and to affect the temperature in the precrystallizer in this manner.

Alternatively, it is possible to detect the height h of the solidified droplet 14 at the end of the coooling conveyor 3, in place of the measuring instrument 30, as this also represents an indication of the crystal content of the droplets coming from the droplet former 2. The higher the crystal content, the higher the granule droplets and vice versa. The height of the solidified droplets may be detected optically or by means of a mechanical scanner. The temperature of the cooling circulation is regulated by these scanners.

It will be appreciated that the present invention obviates certain shortcomings heretofore present in the art. For example, by forming droplets by means of the relatively rotational inner and outer tubes, the droplets can be formed rapidly, thereby minimizing the travel time of the melt from the precrystallizer to the droplet former and any premature crystallization which could otherwise result. The use of a pump, instead of gravity, for feeding the melt to the droplet former increases the throughput rate. Since the conduit which delivers melt to the inner tube has substantially the same inner diameter as that of the inner tube, a constant flow rate results. The system is airtight, whereby no chemical conversion of the melt occurs as a result of contact with oxygen. The bypass arrangement makes it possible to provide a greater volume of material flowing through the precrystallizer than that flowing to the droplet former. The use of a vibrator to vibrate the cooling surface results in the droplets attaining a more desirable configuration.

Although the present invention has been described in connection with a preferred embodiment thereof, it will be appreciated by those skilled in the art that additions, deletions, modifications, and substitutions, not specifically described, may be made without departing from the spirit and scope of the invention as defined in the appended claims.

What is claimed is:

1. An apparatus for producing granules from two-phase mixtures comprising a temperature controlled precrystallizer means for cooling an initial substance enriched with crystal nuclei and wherein the resultant precrystallized melt is fully crystallized on a cooling surface, said apparatus further comprising a droplet former disposed over said cooling surface and including inner and outer telescoping tubes, said tubes having mutually facing surfaces which interengage, said inner tube communicating downstream with said precrystallizer and having a plurality of outlet orifices for conducting the precrystallized melt outwardly therethrough, said outer and inner tubes being arranged for relative rotation, said outer tube having a plurality of discharge orifices which are intermittently alignable with said outlet apertures in response to relative rotation between said tubes for discharging drops of precrystallized mass onto said cooling surface, and means for effecting relative rotation between said inner and outer tubes.

2. Apparatus according to claim 1 including means for effecting a forced flow of precrystallized melt to said droplet former.

3. Apparatus according to claim 2, wherein said droplet former is connected to said precrystallizer by means of a sealed conduit.

4. Apparatus according to claim 1, wherein said precrystallizer includes a bypass circuit and a pump located therein, a conduit interconnects said bypass circuit with said droplet former.

5. Apparatus according to claim 1 including a conduit communicating said precrystallizer with said droplet former, and a shut-off valve disposed in said conduit.

6. Apparatus according to claim 1 including a metering pump for forcing precyrstallized melt from said precrystallizer to said droplet former.

7. Apparatus according to claim 1, wherein said metering pump comprises a gear pump.

8. Apparatus according to claim 1 including a vibrator arranged to vibrate said cooling surface in the vicinity where droplets fall from said droplet former.

9. Apparatus according to claim 1, wherein said outer tube is rotated relative to said inner tube.

10. Apparatus according to claim 1, wherein said outlet orifices are aligned longitudinally along said inner tube.

11. Apparatus according to claim 1, wherein said cooling surface comprises a conveyor belt.

12. An apparatus for producing granules from two-phase mixtures comprising a temperature controlled precrystallizer means for cooling an initial substance enriched with crystal nuclei and wherein the resultant precrystallized melt is fuly crystallized on a cooling surface, said apparatus further comprising a droplet former disposed over said cooling surface and including inner and outer telescoping tubes, said tubes having mutually facing surfaces which interengage, said inner tube communicating downstream with said precrystallizer and having a plurality of outlet orifices for conducting the precrystallized melt outwardly therethrough, said outer and inner tubes being arranged for relative rotation, said outer tube having a plurality of discharge orifices which are intermittently alignable with said outlet orifices in response to relative rotation between said tubes for discharging drops of precrystallized mass onto said cooling surface, and means for effecting relative rotation between said inner and outer tubes, said droplet former being connected to said precrystallizer by means of a sealed conduit, said sealed conduit having substantially the same diameter as the inner tube of said droplet former, and means for effecting a forced flow of precrystallized melt to said droplet former.

* * * * *